United States Patent [19]
Schnapp et al.

[11] Patent Number: 5,634,375
[45] Date of Patent: Jun. 3, 1997

[54] LOCKING DEVICE WITH COMPENSATION ELEMENT

[75] Inventors: Peter Schnapp, Nuremberg; Reinhart Malik, Herzogenaurach; Klaus Kramer, Baudenbach, all of Germany

[73] Assignee: Ina Walzlager Schaeffler KG, Germany

[21] Appl. No.: 555,093

[22] Filed: Nov. 8, 1995

[30] Foreign Application Priority Data

Jan. 20, 1995 [DE] Germany ................. 195 01 607.6

[51] Int. Cl.⁶ .................. G05G 5/06; H01H 3/16
[52] U.S. Cl. .................. 74/475; 74/527; 200/61.91
[58] Field of Search .................. 74/475, 477, 527;
477/99; 200/61.88, 61.91; 340/456

[56] References Cited

U.S. PATENT DOCUMENTS

| | | | |
|---|---|---|---|
| 3,423,549 | 1/1969 | Sondej | 200/61.88 |
| 3,431,374 | 3/1969 | Raab | 200/61.88 |
| 3,461,256 | 8/1969 | Ferryman, Jr. | 200/61.88 |
| 4,539,859 | 9/1985 | Arai et al. | 74/475 |
| 4,544,588 | 10/1985 | Schauf | 428/35 |
| 4,941,368 | 7/1990 | De Boer et al. | 74/527 |

FOREIGN PATENT DOCUMENTS

| | | | |
|---|---|---|---|
| 582804 | 2/1994 | European Pat. Off. | 340/456 |
| 2675853 | 10/1992 | France . | |
| 4103465 | 8/1992 | Germany . | |
| 4215187 | 11/1993 | Germany | 74/475 |
| 9316843 | 2/1994 | Germany . | |
| 9407205 | 8/1994 | Germany . | |
| 4307596 | 9/1994 | Germany . | |
| 1298096 | 11/1972 | United Kingdom | 200/61.91 |
| WO 92/09834 | 6/1992 | WIPO | 74/475 |

OTHER PUBLICATIONS

AWF-VDMA-VDI Getriebehefte, H.1, 1955, S.22.

*Primary Examiner*—Richard M. Lorence
*Attorney, Agent, or Firm*—Bierman, Muserlian and Lucas LLP

[57] ABSTRACT

A locking device for a positional fixing of a displaceable adjusting element for a selector shaft of a mechanical gear transmission of a motor vehicle comprising an outer housing (2) and, displaceably guided therein, a locking pin (8) loaded at one end by a compression spring (14) which is supported on a bottom (15) and causes a stroke movement of the locking pin (8), the selector shaft comprising a recess which is engaged by a spherical locking element (11) retained in an end of the locking pin (8) facing away from the compression spring, the locking device further comprising an electric switching element (25) which can be activated by an actuating element arranged on the locking pin (8), characterized in that the actuating element is an compensation element (16a to 16d).

16 Claims, 4 Drawing Sheets

LOCKING DEVICE WITH COMPENSATION ELEMENT

STATE OF THE ART

A locking device for a positional fixing of a displaceable adjusting element for a selector shaft of a mechanical gear transmission of a motor vehicle is known from DE-A 41 03 465 in which, an electric switching element is arranged in an outer element of the device at its end away from the locking pin, and a compression spring coaxially surrounds the electric switching element. On displacement of the locking pin, the switching element can be actuated by means of a peg inserted in the locking pin. Length tolerances resulting from the structure of the locking device influence the stroke travel of the pin. The structure and the arrangement of the electric switching element are likewise subject to length tolerances and have an effect on the switching contact and thus on the switching precision. An addition of manufacturing and/or length tolerances can result in the locking device not meeting the requirements of switching precision.

OBJECTS OF THE INVENTION

It is an object of the invention to provide a locking device which can compensate structure-dependent length tolerances without a modification of the outer dimension of the locking device and has no influence on the switching hysteresis, while being economically manufacturable.

This and other objects and advantages of the invention will become obvious from the following detailed description.

THE INVENTION

The locking device of the invention for a positional fixing of a displaceable adjusting element for a selector shaft of a mechanical gear transmission of a motor vehicle comprising an outer housing (2) and, displaceably guided therein, a locking pin (8) loaded at one end by a compression spring (14) which is supported on a bottom (15) and causes a stroke movement of the locking pin (8), the selector shaft comprising a recess which is engaged by a spherical locking element (11) retained in an end of the locking pin (8) facing away from the compression spring, the locking device further comprising an electric switching element (25) which can be activated by an actuating element arranged on the locking pin (8), is characterized in that the actuating element is an compensation element (16a to 16d).

The object of the invention is achieved by providing a length compensation element which is arranged between the displaceably mounted locking pin and a rigid, positionally fixed component of the locking device. The compensation element of the invention has a simple structure and can be integrated into the existing design space of the locking device. This length compensation element is arranged so that it does not impede the operation of the other components of the device and has no effect on the sensitive switching hysteresis. Further, this compensation element adapted to the operation of the locking device is economical to manufacture.

In an advantageous embodiment of the invention, the length compensation element is positionally fixed in the locking pin while its other end is guided preferably in a bore of the bottom of the outer element.

Advantageously, the compensation element is an adjustable element having an adjustable length which can be adjusted after all components of the locking device have been assembled. This possibility guarantees an exact determination of the switching point of the electric switching element so that the switching precision can be influenced and the series variance is negligible. The compensation element of the locking device of the invention also permits one to take into account the position or length tolerance which results in the installed state, for example, between the contacting surface of the locking device on the transmission casing and the recess for the locking element in the selector shaft.

According to another embodiment of the invention, the compensation element is coaxially surrounded by the compression spring and is therefore integrated into an existing hollow space.

Further, the compensation element may be a two-piece element whose individual parts form an inseparably secured structural unit when the adjustable dimension has been set. For this purpose, there is provided in the locking pin, a positionally fixed bush into which is inserted a peg configured as a fixing pin. The bush and the fixing pin are form-fitted or retained by force engagement. Alternatively, a glued, pressed or shrinkage joint may be used to obtain an inseparable connection after the adjustable dimension has been set. Particularly advantageous is the use of a screw thread or aligned gearings on the two parts which permit them to telescope into each other under the action of a force.

The bush inserted into the locking pin can be provided with an annular flange to form a support for the compression spring. The radial dimension of this spring support is adapted to match the outer periphery of the compression spring. Advantageously, the compression spring is centered on the bush inserted in the locking pin and this internal centering effects a desired reduction of friction and thus has a positive effect on the switching hysteresis.

In an alternative embodiment of the invention, the compensation element is a one-piece element. To reduce the number of components, the peg of the compensation element is inserted directly into a pocket bore of the locking pin and undetachably fixed after setting of the operating length. In another advantageous embodiment of the invention, the compensation element is positionally fixed on the locking pin and on the bottom and is plastically deformable under the action of a force to adjust the desired length, or the compensation element can be elastically deformed and fixed when the end position is reached.

According to another feature of the invention, the compensation element is made of a heat-resistant material to avoid a length variation under the influence of temperature. Particularly suitable for this purpose are aluminum or a plastic material such as PA 66 GF. The invention also includes making the sleeve and the peg, which together constitute the compensation element, of different materials.

Advantageously, the compensation element of the invention serves to actuate the electric switching element. This is appropriately obtained if the compensation element, provided with a disc or an annular flange, is simultaneously used as an actuating element for the electric switching element.

BRIEF DESCRIPTION OF THE DRAWINGS

FIG. 1 shows a locking device (1) comprising an outer housing (2) which is mounted by a thread (3), for example, in a transmission casing, not shown in FIG. 1. A running bush (5) positionally fixed in an inner bore (4) of the outer housing (2) serves to guide rolling elements (6) of a rolling bearing (7) for a locking pin (8a). At its end projecting out of the outer housing (2), the rotationally symmetrical locking pin (8a) comprises a spherical cup-shaped recess (9) in which a locking element (11) is retained and mounted for rotational movement on a rolling bearing (10). At its end away from the locking element (11), the locking pin (8a) comprises a pocket bore (12) on whose end face (13) is supported one end of a compression spring (14). The other end of the compression spring bears against a bottom (15) which is made preferably without chip removal by deep-drawing from sheet metal and is secured against rotation on the outer housing (2).

Figure 1:
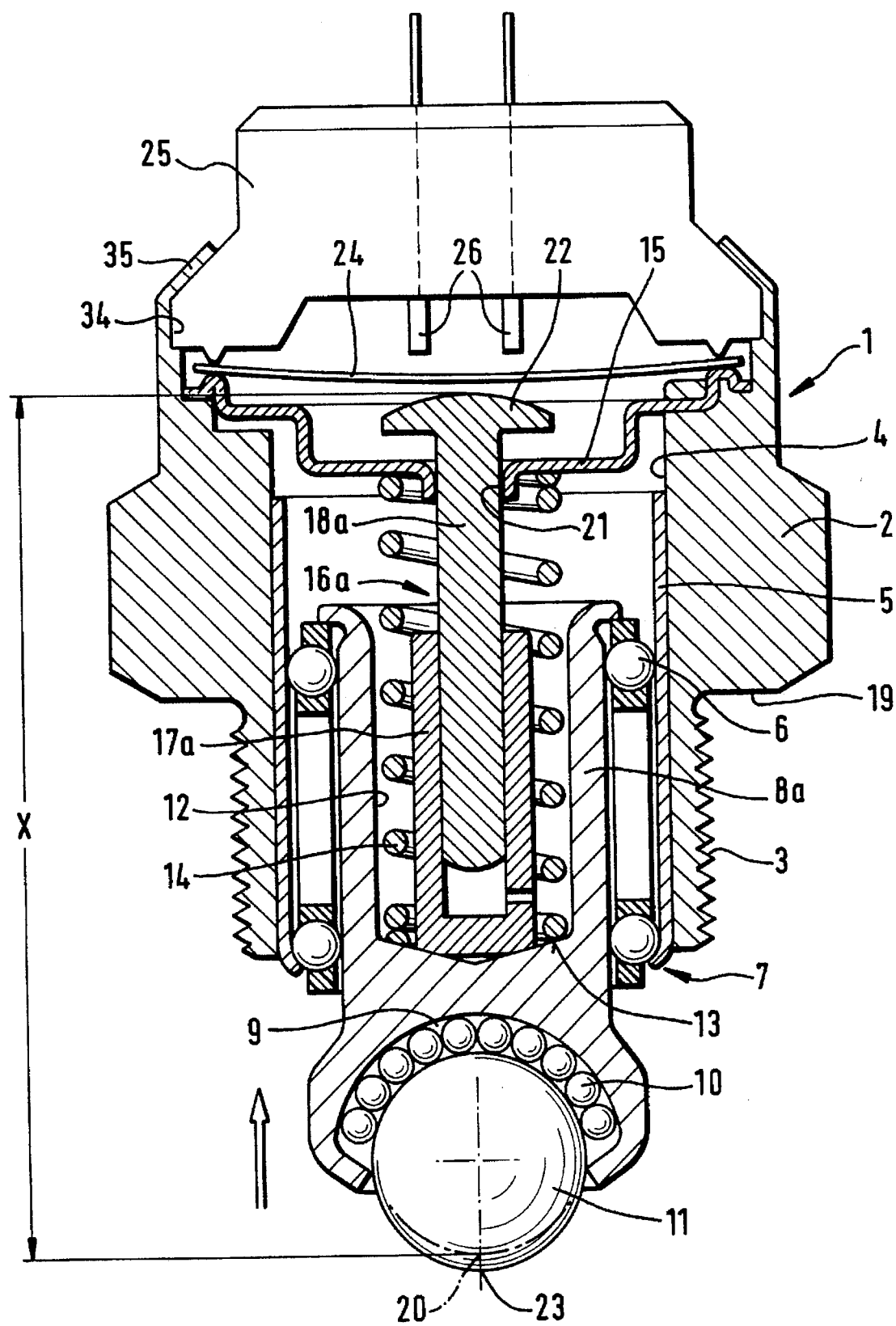
FIG. 1 is a longitudinal cross-section of a locking device comprising a length compensation element of the invention.

Between the bottom (15) and the end face (13), there is inserted a compensation element (16a). The compensation element (16a), comprised of a bush (17a) fixed on the locking pin (8a) and a peg (18a), which can be positionally fixed in the bush (17a), serves to compensate manufacturing tolerances and to set a dimension "X" between an operating position (20) of the locking element (11) and the front end of the peg head (22). A modification of the dimension "X" therefore effects a modification of the portion of the locking pin (8a) projecting out of the outer housing (2). On the side of the convex peg head (22) facing away from the bottom (15), there is arranged in the locking device (1), a contacting element (24) which element can perform a double function, for example, of a packing rubber and of a contacting surface and is curved towards the compensation element (16a), i.e. it is inserted with pre-tension.

On displacement of the locking pin (8a) in arrow direction, the peg head (22) at first comes to bear against the contacting element (24) which, on further displacement of the locking pin (8a), connects the contacts (26) of the switching element (25). At the end of the locking device (1) facing away from the locking element (11), the switching element (25) is inserted into a bore (34) and positionally fixed by an angled rim (35). With the help of the compensation element (16a) by which the cumulative tolerances of the individual components of the locking device are compensated while also taking into account the mounting tolerances of the switching element (25), a desired, improved switching precision of the switching element (25) can be obtained with which, for example, the switching operation of the locking device (1) can be monitored and/or an optical or acoustic signal given.

Figure 2:
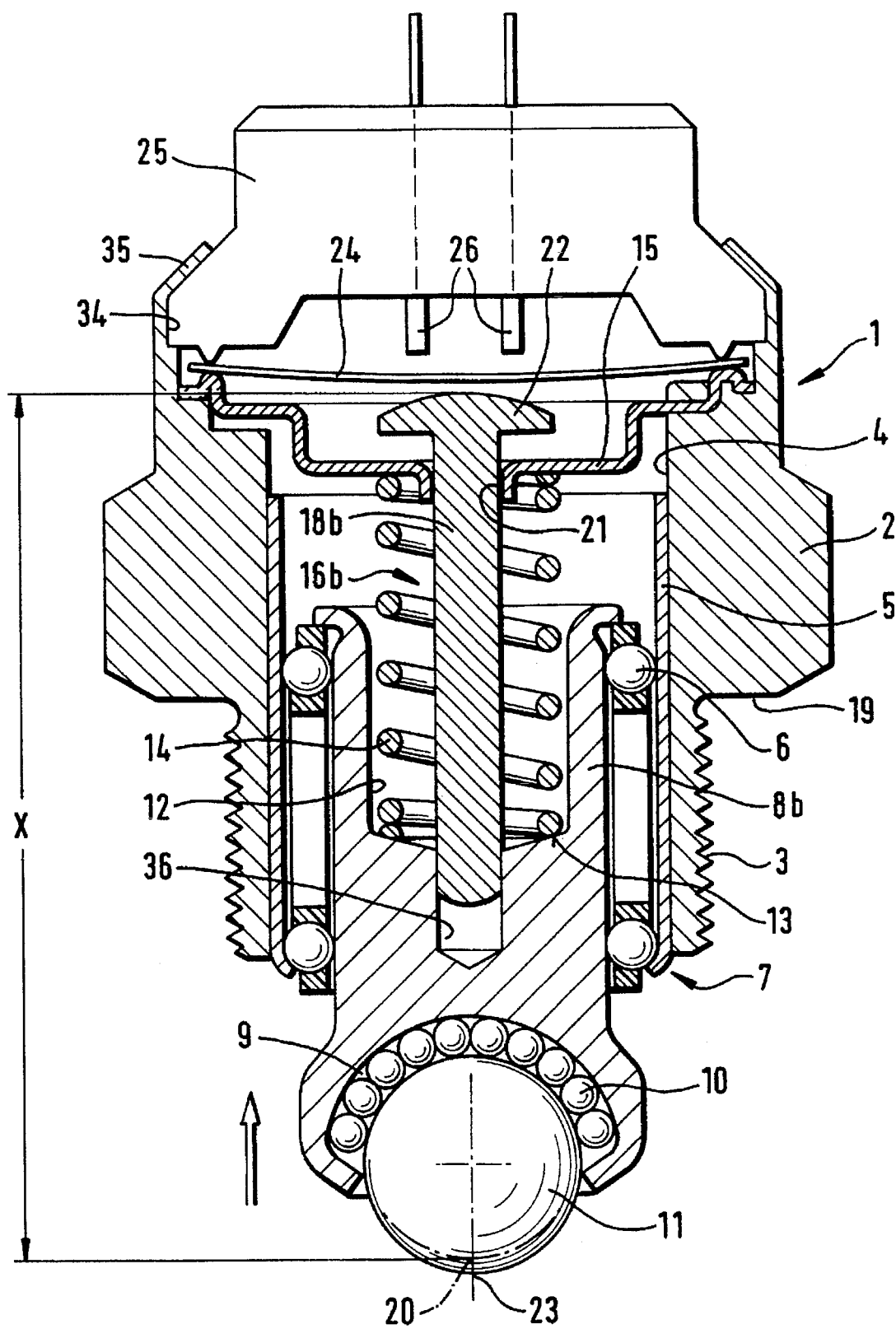
FIG. 2 shows a locking device corresponding to that of FIG. 1, with the peg of the compensation element pressed into the locking pin.

In the second example of embodiment of the locking device (1) of the invention shown in FIG. 2, components identical to those of the first embodiment are designated by the same reference numerals, so that reference can be made to the first example of embodiment for their description. In contrast to FIG. 1, the compensation element (16b) shown in FIG. 2 is comprised of peg (18b) which is retained directly in a pocket bore (36) of the locking pin (8b). To obtain a permanent positional securing of the peg (18b) in the locking pin (8b), it is possible, for example, to use a press fit or a glued joint. Alternatively, a shrinkage joint between the peg (18b) and the pocket bore (36) may also be used.

Figure 3:
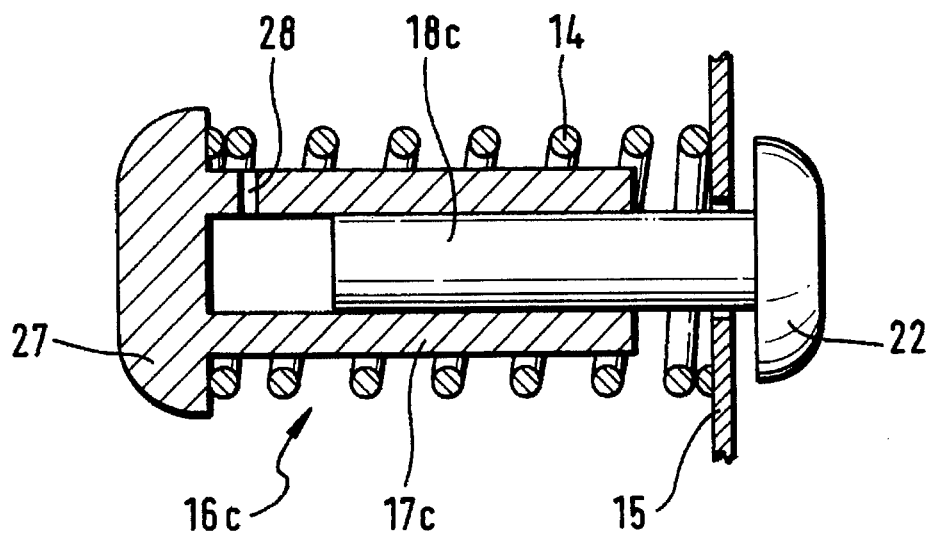
FIG. 3 shows a two-piece compensation element whose individual parts are joined to each other by pressing.
Figure 4:
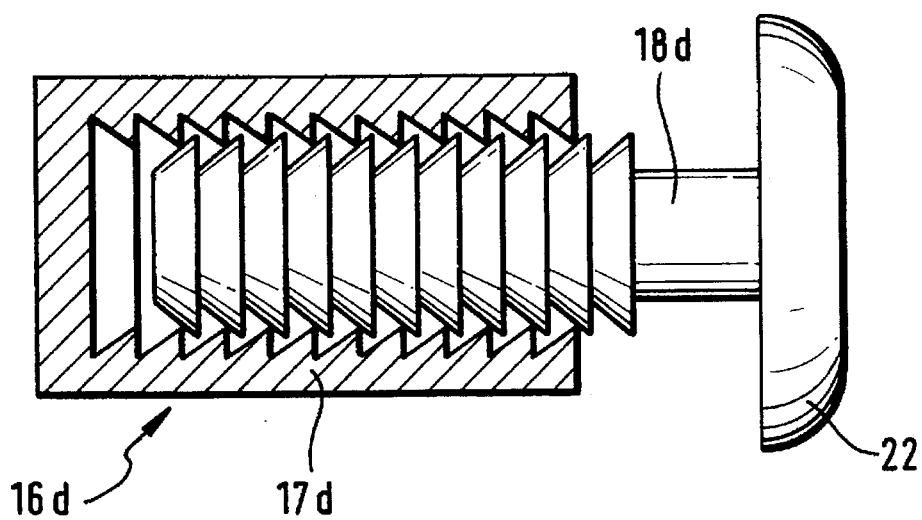
FIG. 4 is a longitudinal cross-section of a two-piece compensation element whose individual parts are connected by meshing gears.

In FIG. 3, the compensation element (16c) is shown in which, in contrast to FIG. 1, the bush (17c) comprises a support (27) for the compression spring (14). This figure further shows a bore (28) in the bush (17c) through which air can escape from the interior of the bush (17c) when the peg (18c) is pressed in. The compensation element (16d) of FIG. 4 comprises the bush (17d) and the peg (18d), each of which comprises an aligned gearing to form a connection which allows the peg (18d) to be pushed relatively easily into the bush (17d) and thus assures a reliable retention of these two parts in every position of retention.

Figure 5:
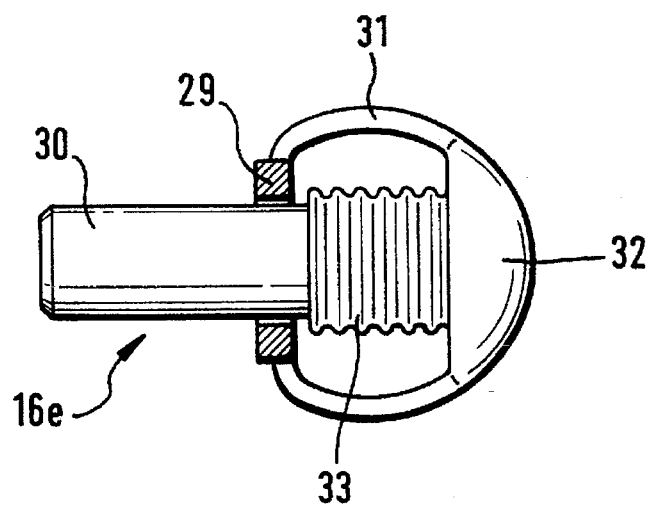
FIG. 5 shows in an initial state, a one-piece compensation element which is deformable under the action of a force.
Figure 6:
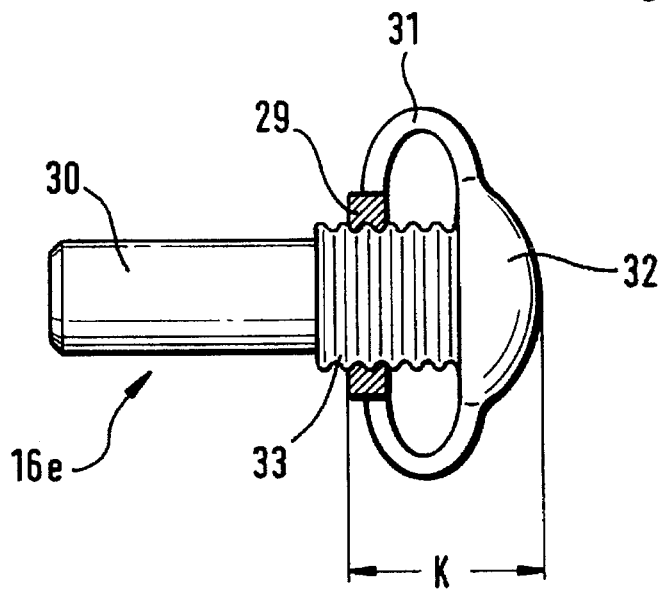
FIG. 6 shows the compensation element of FIG. 5 in its deformed, adjusted final state.

FIGS. 5 and 6 show a one-piece compensation element (16e) which is plastically deformable or, alternatively, possesses an elastic deformability and can be positionally fixed when an operation length has been reached so that a permanent setting of the required length is possible. In the initial state, the compensation element (16e) has a hood-like configuration with lateral recesses which merge into an annular element (29) arranged concentrically around a shaft (30) of the compensation element (16e). Webs (31) starting from the annular element (29), which is advantageously fixed on the locking pin (8a) or (8b), are arranged in spaced relationship on the outer periphery and converge to form a cap (32) arranged on an end of the shaft (30). Under the action of a force, a permanent deformation can be obtained which causes the webs (31) to yield radially outwards so that the cap (32) is displaced axially towards the annular element (29). To fix the annular element (29) in the desired position and to permanently maintain an operating position with a headroom "K", a bush-like securing element (33) with a wavy outer surface is arranged on the end of the shaft facing the cap (32). The annular element (29) is positionally fixed by locking onto the securing element (33). A suitable material for the compensation element (16e) is, for example, steel sheet, light-weight metal or a permanently deformable, heat-resistant plastic material.

Various modifications of the locking device of the invention may be made without departing from the spirit or scope thereof and it is be understood that the invention is intended to be limited only as defined in the appended claims.

What we claim is:

1. A locking device for a positional fixing of a displaceable adjusting element for a selector shaft of a mechanical gear transmission of a motor vehicle comprising an outer housing (2) and, displaceably guided therein, a locking pin (8) loaded at one end by a compression spring (14) which is supported on a bottom (15) of the outer housing (2) and causes a stroke movement of the locking pin (8), a spherical locking element (11) which is retained in the locking pin (8) in an end thereof facing away from the compression spring (14) and which, in an installed state of the locking device locks a movable adjusting element by positive engagement, the locking device further comprising an electric switching element (25) which can be activated by an actuating element arranged on the locking pin (8), characterized in that the actuating element comprises a compensation element (16a to 16d) which permits a manual adjustment of a length dimension between the locking pin (8) and the switching element (25).

2. A locking device of claim 1 wherein the compensation element (16a to 16c) is positionally fixed in the locking pin (8) and a guidance of the adjusting element is assured by an element separate from the locking pin (8).

3. A locking device of claim 1 wherein the compensation element (16a to 16d) is adjustable in length and components of the compensation element determining the installed length thereof are retained by form-fitting and/or force engagement.

4. A locking device of claim 3 wherein the compensation element (16a to 16d) can be adjusted after completion of assembly of all components of the locking device (1).

5. A locking device of claim 1 wherein the compensation element (16a, 16b) is coaxially surrounded by the compression spring (14).

6. A locking device of claim 3 wherein the compensation element (16a, 16c, 16d) is a two-piece element whose individual parts are retained in a final position.

7. A locking device of claim 6 wherein the compensation element (16a, 16c, 16d) comprises a bush (17a, 17c, 17d) which is positionally fixed in the locking pin (8a) and houses a peg (18a, 18c, 18d).

8. A locking device of claim 6 wherein a gearing or a screw thread is provided between individual parts of the compensation element (16d).

9. A locking device of claim 7 wherein an end of the bush (17c) facing the locking pin (8) comprises a support (27) for the compression spring (14).

10. A locking device of claim 7 wherein the compression spring (14) is internally centered on the bush (17b).

11. A locking device of claim 3 wherein the compensation element (16b) is a one-piece element with a peg (18b) inserted directly into a pocket bore (36) of the locking pin (8b).

12. A locking device of claim 3 wherein the compensation element (16e) is a one-piece element which is plastically deformable in an installed state, or has an elastic deformability which permits it to be fixed in any desired final position.

13. A locking device of claim 1 wherein the compensation element (16a to 16d) is made of a heat-resistant material.

14. A locking device of claim 13 wherein the heat resistant material is aluminum or a plastic.

15. A locking device of claim 13 wherein the heat resistant material is PA 66 GF.

16. A locking device of claim 6 wherein a contacting element (24) of the electric switching element (25) can be activated by a peg head (22) formed on one end of a peg (18c) of the compensation element (16c).

* * * * *